March 31, 1959 R. J. WILKIE 2,879,813
BAND SAW DRIVE WHEEL HAVING ADJUSTABLE BAND BACK-UP FLANGE
Filed Aug. 19, 1957 2 Sheets-Sheet 1

Inventor
Robert J. Wilkie
By
Attorney

March 31, 1959 R. J. WILKIE 2,879,813
BAND SAW DRIVE WHEEL HAVING ADJUSTABLE BAND BACK-UP FLANGE
Filed Aug. 19, 1957 2 Sheets-Sheet 2

Inventor
Robert J. Wilkie

United States Patent Office 2,879,813
Patented Mar. 31, 1959

2,879,813

BAND SAW DRIVE WHEEL HAVING ADJUSTABLE BAND BACK-UP FLANGE

Robert J. Wilkie, Minneapolis, Minn., assignor to Continental Machines, Inc., Savage, Minn., a corporation of Minnesota Application August 19, 1957, Serial No. 678,944

2 Claims. (Cl. 143—30)

This invention relates generally to band saws and band cut-off saws, such as that disclosed in the copending application of Robert L. Crane, Serial No. 643,600, filed March 4, 1957; and the invention relates more particularly to drive wheels or pulleys around which the blades of such saws are trained.

Band saw machines of the type with which this invention is concerned are provided with a saw head assembly including an endless saw band trained about a plurality of pulleys or wheels mounted for rotation on spaced parallel axes. One of the wheels about which the band is trained is power driven and drives the saw band by frictional engagement between one face of the band and the periphery of the wheel.

Band saw machines may be used for many different purposes and with blades of many different widths. Where the drive wheels or pulleys have rubber treads on their circumferential blade engaging surfaces, as has heretofore been conventional, it has been feasible to use relatively wide drive wheels and to have the entire width of the saw band engaging the peripheries of the drive wheels. The rubber treads on the wheels of course prevented damage to the teeth on the band as the band traversed the drive wheels.

However, in machines such as high speed cut-off saws, where the cutting stretch of the saw band must be bathed in lubricant, it has been found impracticable to use such rubber tread wheels because the film of lubricant clinging to the blade causes marked slippage between the drive wheel and the saw band. The aforesaid copending application of Robert L. Crane discloses a drive wheel for cut-off saws and the like wherein such slippage is overcome by the provision of an all metal drive wheel having narrow lands or ridges extending circumferentially around its blade-engaging surface.

When all-metal drive wheels are used, however, it becomes necessary to insure that the teeth on the saw band will not be brought into engagement with the wheel periphery as the blade traverses the wheel. This is because the blade is trained around the drive wheels under substantial tension, and the hard surfaces of the wheel peripheries would not only dull the teeth but cause them to be bent out of their proper "set," and the wheels would also be damaged by the saw teeth.

It is therefor an object of the present invention to provide a drive wheel for the blade of a band saw or power cut-off saw having a flange against which the back of the blade engages, and by which the blade is held in a position relative to the wheel such that the teeth on the blade project axially beyond the blade engaging surface of the wheel, and wherein the axial position of the flange on the wheel is adjustable to vary the axial width of the blade engaging circumferential surface of the wheel and thus assure that the teeth of the saw band will not contact the wheel, regardless of the width of the blade being used.

Stated another way, it is a general object of this invention to provide a drive wheel for a band sawing machine, featuring the hard driving surface with circumferential lands described in the aforesaid copending application, which drive wheel is adapted to accommodate saw bands of any width by reason of the fact that it is provided with an axially adjustable flange against which the back of the blade is adapted to engage, and by which the blade is so disposed with respect to the wheel that its teeth project beyond the circumferential blade engaging surface of the wheel, thus assuring that the blade cannot be damaged by engagement of its teeth against said surface of the wheel.

Another object of this invention resides in the provision of means for adjustably positioning the flange axially relative to the circumferential blade engaging surface of a band saw drive wheel of the character described, and for holding the flange in any desired position of such adjustment.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which.

Figure 1:
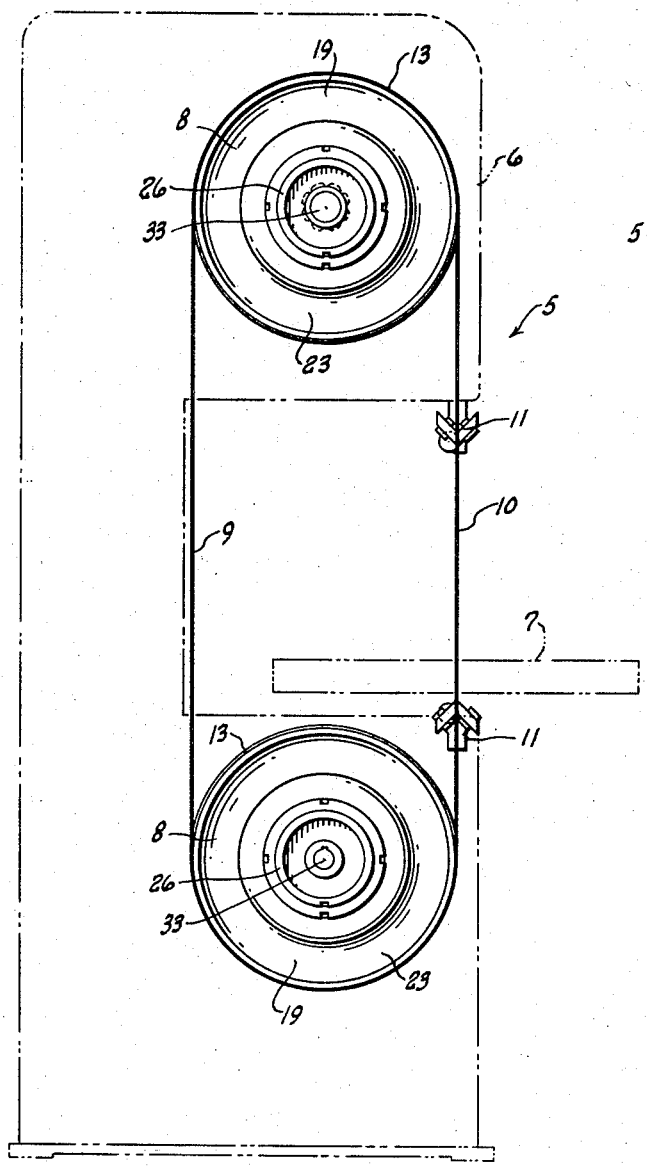
Figure 1 is a side elevational view of a pair of saw band drive wheels of this invention mounted on a band saw and having a saw band trained over them.
Figure 2:
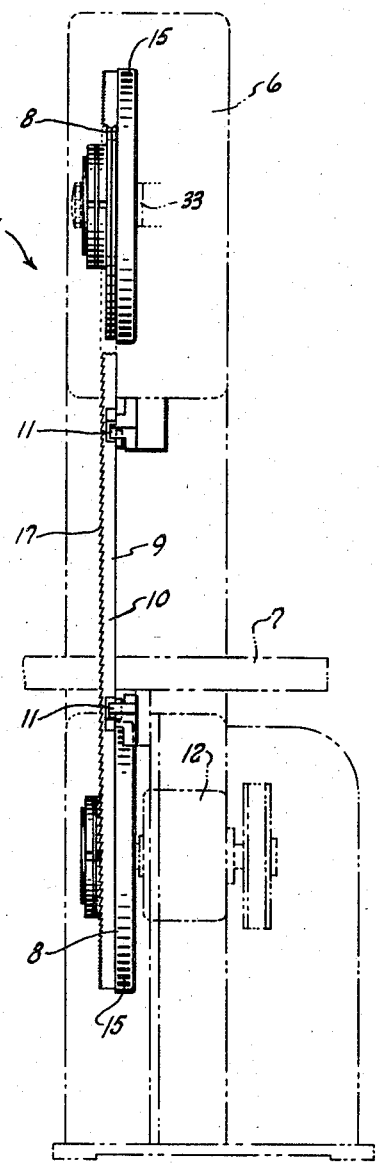
Figure 2 is a front elevational view of the apparatus shown in Figure 1.
Figure 3:
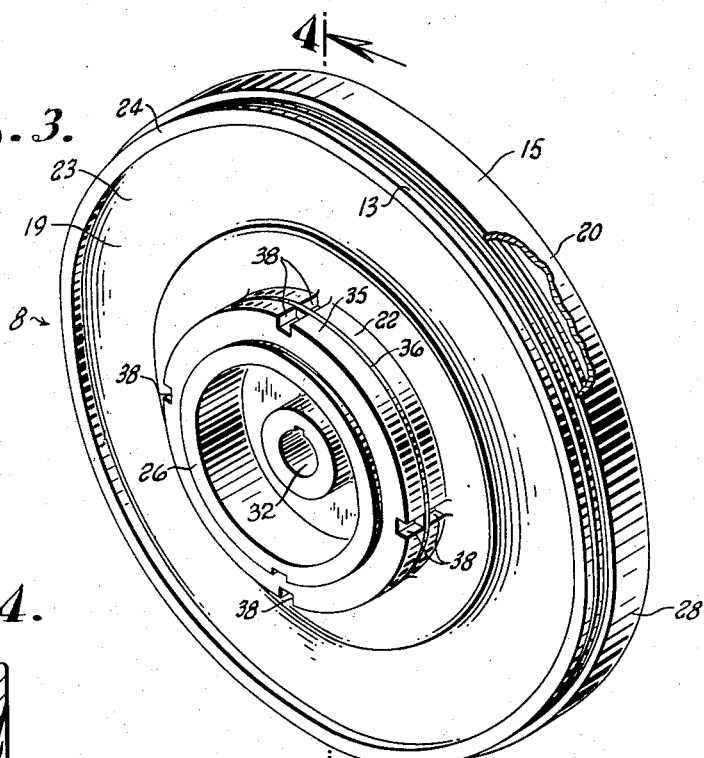
Figure 3 is a perspective view of a band saw drive wheel embodying the principles of this invention, a portion being shown broken away.
Figure 4:
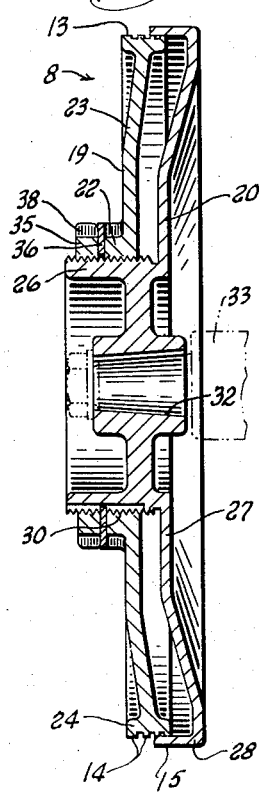
Figure 4 is a sectional view taken on the plane of the line 4—4 in Figure 3.

Referring now to the accompanying drawings, the numeral 5 designates generally a band saw having a substantially C-shaped supporting frame 6 upon which is mounted a work supporting table 7 and a pair of drive wheels 8 around which a blade or saw band 9 is trained. The drive wheels are mounted for rotation on parallel axes and carry the blade with one stretch 10 thereof passing through a slit in the table and through vertically spaced apart saw guides 11 located above and below the table. At least one of the drive wheels is driven by an electric motor 12 to propel the blade 9 lengthwise in orbital motion.

Figure 5:
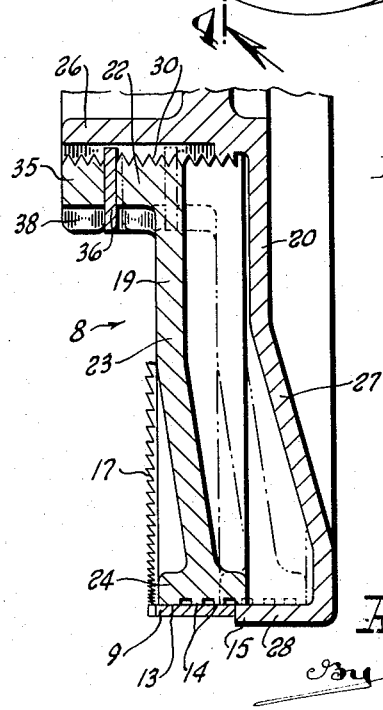
Figure 5 is a fragmentary sectional view similar to Figure 4 but on enlarged scale and showing a portion of a saw band in place on the wheel.

Each of the wheels 8 has a circumferential blade engaging surface 13 over which the blade lies and which is provided with narrow circumferentially extending lands 14 as described in the aforesaid copending application of Robert L. Crane. Each wheel also has an annular flange 15 around its blade engaging surface against which the back edge of the saw blade is adapted to engage, as best seen in Figure 5, to hold the blade with its teeth 17 projecting outwardly beyond the front of the wheel.

It is a feature of the drive wheel of this invention that it provides for axial adjustment of the position of the flange relative to the circumferential blade engaging surface of the wheel to thereby accommodate the wheel to saw bands of different widths, thus assuring that the teeth on the blade will never engage said circumferential surface on the wheel. To this end the wheel comprises a pair of cooperating wheel members 19 and 20. The wheel member 19 has an axially short hub portion 22, a web portion 23 extending radially from said hub portion, and a rim or felly portion 24 which provides the circumferential blade engaging surface 13 of the wheel assembly. The other wheel member 20 has a hub portion 26 which is substantially longer axially than the hub portion 22, a web portion 27, and a rim or felly portion 28 which comprises an annular flange projecting forwardly from the web portion 27 and having an inside diameter to closely embrace the circumferential blade engaging surface on the wheel member 19, so that the flange may be telescoped over said blade engaging surface to expose more or less thereof in accordance with the width of saw blade to be used.

To provide for relative telescoping adjustment between the rim portions of the two wheel members, the hub portion 26 of wheel member 20 has a cylindrical outer surface which is externally threaded, as at 30, while the hub portion of wheel member 19 has a corresponding internal thread. Thus when the wheel members are rotated relative to one another, the threaded connection between their hub portions shifts them axially relative to one another to effect the above described telescoping adjustment of their felly portions.

The hub portions 26 of the wheel member 20 also has a bore 32 in which a shaft 33 for the wheel may be received.

To assure that the two wheel members will remain in any position of axial adjustment to which they may be set, a lock nut 35 is also threaded onto the hub portion 26 of wheel member 20, and engages against a washer 36 which is thus clamped against the front surface of hub portion 22 of wheel member 19. Hub portion 22 and the lock nut are both provided with spanner wrench receiving slots 38 by which their rotation on hub portion 26 is facilitated.

Obviously the hub portions of the two wheel members could be interchanged; that is, the wheel member having the blade engaging circumferential surface on its rim could be provided with an externally threaded hub portion while the wheel member which carries the flange could have its hub portion internally threaded.

From the foregoing description taken together with the accompanying drawings it will be apparent that this invention provides a drive wheel for saw bands which features the circumferentially flanged blade engaging surface of the aforesaid copending application of Robert L. Crane, and wherein an axially adjustable flange on the wheel adapts the wheel to saw bands of different widths, assuring that the teeth of the saw band will project beyond the circumferential blade engaging surface of the wheel, rather than coming into contact therewith, and having means for readily adjusting the axial position of the flange to accommodate the wheel for any width of blade and means for holding the flange in any such position of adjustment.

What is claimed as my invention is:

1. In a drive wheel for band saws: a first wheel member having an externally threaded cylindrical hub portion and a web portion extending radially from said hub portion; a second wheel member having an internally threaded hub portion, threadedly connected with the hub of said first wheel member, and a web portion extending radially from its hub portion; a rim on the web of one of said wheel members providing a circumferential face over which a saw band is adapted to be trained; an annular flange on the web of the other of said wheel members adapted to closely embrace said circumferential face of the rim on the one wheel member and to be telescoped thereover, the threaded connection between the hub portions of said wheel members providing for relative axial adjustment between the wheel members by which the axial length of the exposed portion of said circumferential face may be adjusted to accommodate saw bands of different widths to assure that the teeth of a saw band trained thereover will be disposed axially outwardly of the circumferential face while the back edge of the saw band engages the flange; and a lock nut threaded onto the hub portion of said first wheel member for holding the second wheel member in any position of axial adjustment relative to the first.

2. In a drive wheel for band saws: a first wheel member having a circumferential face around its rim over which a saw band is adapted to be trained; a second wheel member having an annular flange adapted to telescopingly embrace said circumferential face on the first wheel member; an externally threaded cylindrical hub portion on one of said wheel members; an internally threaded hub portion on the other wheel member cooperating with the cylindrical hub portion of said one wheel member to mount the wheel members for axial adjusting motion relative to one another whereby the flange on said second wheel member may be telescoped over the rim of the first wheel member in varying degrees so that saw bands of different widths may be accommodated on the exposed portion of said circumferential face, with the back of the band engaging said flange and the teeth of the band projecting beyond the face of the wheel; and a lock nut on the externally threaded hub portion of said one wheel member for holding the wheel members in any desired position of axial adjustment relative to one another.

References Cited in the file of this patent

UNITED STATES PATENTS

| | | |
|---|---|---|
| 451,590 | Barker | May 5, 1891 |

FOREIGN PATENTS

| | | |
|---|---|---|
| 13,275 | Germany | May 14, 1881 |
| 652,832 | Germany | Nov. 9, 1937 |